(12) United States Patent
Lutgen

(10) Patent No.: US 6,595,885 B1
(45) Date of Patent: Jul. 22, 2003

(54) TRANSMISSION CONTROL SYSTEM AND METHOD

(75) Inventor: F. Paul Lutgen, Edwards, IL (US)

(73) Assignee: Caterpillar Inc, Peoria, IL (US)

( * ) Notice: Subject to any disclaimer, the term of this patent is extended or adjusted under 35 U.S.C. 154(b) by 3 days.

(21) Appl. No.: 10/029,245

(22) Filed: Dec. 28, 2001

(51) Int. Cl.[7] ............................................. F16H 47/04
(52) U.S. Cl. ...................................................... 475/76
(58) Field of Search .......................................... 475/76

(56) References Cited

U.S. PATENT DOCUMENTS

| | | | |
|---|---|---|---|
| 3,722,323 A | | 3/1973 | Welch |
| 3,903,756 A | * | 9/1975 | Hamma ........................ 475/76 |
| 4,122,732 A | | 10/1978 | Chana |
| 4,355,509 A | | 10/1982 | Fulkerson et al. |
| 4,462,275 A | | 7/1984 | Mohl et al. |
| 4,875,390 A | | 10/1989 | Hayashi et al. |
| 4,941,371 A | * | 7/1990 | Koyama et al. ............... 475/76 |
| 5,421,790 A | | 6/1995 | Lasoen |
| 5,624,339 A | | 4/1997 | Coutant et al. |
| 5,667,452 A | | 9/1997 | Coutant |
| 5,682,315 A | | 10/1997 | Coutant et al. |
| 5,684,694 A | * | 11/1997 | Ishino et al. ................... 475/76 |
| 5,842,144 A | | 11/1998 | Coutant et al. |
| 6,220,966 B1 | | 4/2001 | Ara et al. |

* cited by examiner

Primary Examiner—Dirk Wright
(74) Attorney, Agent, or Firm—Finnegan, Henderson, Farabow, Garrett & Dunner, L.L.P.

(57) ABSTRACT

A method and system for controlling a transmission in a work machine is provided. The output of a hydrostatic transmission having a source of pressurized fluid is combined with the output of a mechanical transmission having at least one engaged clutch. An operational speed of an engine that provides an input to both the hydrostatic transmission and the mechanical transmission is sensed. The at least one clutch of the mechanical transmission is disengaged and the displacement of the source of pressurized fluid is modified when the operational speed of the engine drops below a stall limit. The disengagement of the at least one clutch and the modification of the displacement of the source of pressurized fluid allow the operational speed of the engine to rise above the stall limit.

20 Claims, 3 Drawing Sheets

TRANSMISSION CONTROL SYSTEM AND METHOD

TECHNICAL FIELD

The present invention is directed to a control system and method for a transmission. More particularly, the present invention is directed to a system and method for controlling a torque output of a transmission in a work machine.

BACKGROUND

Work machines, such as, for example, wheel loaders, track loaders, bulldozers, and backhoes, typically use a transmission to translate the rotational speed of an engine shaft into a drive speed. These transmissions are typically operable to provide a series of gear ratios that translate the speed of the engine shaft into different drive speeds. The gear ratios usually include forward and reverse speeds that range from low to high to provide different powers and speeds for the work machine as different operating conditions are encountered.

Some work machines are designed to work in low speed ranges and require precise speed control through the low speed ranges. To achieve this speed control, a split torque transmission may be used to convert the rotational speed of the engine shaft. This type of transmission combines the outputs of a hydrostatic transmission and a mechanical transmission to rotate a drive shaft and move the vehicle.

A split torque transmission may be operated with one or both of the hydrostatic and mechanical transmissions. Typically, the work machine operates on the hydrostatic transmission alone when the machine is operating in the low speed range, such as, for example, when digging or loading operations are performed. The work machine will usually engage the mechanical transmission to supplement the hydrostatic transmission when higher speeds are required. For example, a wheel loader may operate on the hydrostatic transmission when moving at speeds up to two miles per hour. When moving at speeds above two miles per hour, the wheel loader will typically engage the mechanical transmission and operate on a combination of the hydrostatic and mechanical transmissions.

As described in U.S. Pat. No. 5,682,315, a control system for a split torque transmission will rely on several indicators to determine when and how to adjust the transmission to achieve a desired speed. To determine the appropriate transmission settings, the control system may monitor the position of several operator inputs, such as, for example, the position of a speed pedal, a range lever, and a direction lever. In addition, the control system may monitor several operating conditions in the work machine, such as, for example, the engine speed, the mechanical transmission output speed, and the hydrostatic transmission output speed. By monitoring these indicators, the control system will be able to determine when and how to adjust the transmission to achieve the desired speed.

This type of control system may not, however, account for unexpected operating conditions, such as, for example, a severe engine underspeed situation. An engine underspeed situation may occur, for example, when the work machine encounters a heavy load, such as a work pile, when moving at a significant ground speed. Encountering the heavy load will rapidly decrease the groundspeed of the work machine and the operational speed of the engine.

If the transmission is not adjusted to account for the increased output load and to allow the engine to resume an acceptable operating speed, the engine may stall. If the drop in engine speed is rapid enough, the control system may not be able to adjust the transmission quickly enough to prevent the engine from stalling. If the engine stalls, the operator will be forced to restart the engine before resuming work, thereby causing an inconvenient interruption in the work process. This, of course, translates to a loss of machine efficiency.

The transmission control system of the present invention solves one or more of the problems set forth above.

SUMMARY OF THE INVENTION

One aspect of the present invention is directed to a method for controlling a transmission in a work machine. The output of a hydrostatic transmission having a source of pressurized fluid is combined with the output of a mechanical transmission having at least one engaged clutch. An operational speed of an engine is sensed. The engine provides an input to both the hydrostatic transmission and the mechanical transmission. At least one clutch of the mechanical transmission is disengaged and the displacement of the source of pressurized fluid is modified when the operational speed of the engine drops below a stall limit. The disengagement of the at least one clutch and the modification of the displacement of the source of pressurized fluid allow the operational speed of the engine to rise above the stall limit.

In another aspect, the present invention is directed to a control system for a transmission that combines a mechanical transmission having at least one clutch and a hydrostatic transmission having a source of pressurized fluid. The control system includes a sensor configured to sense the operational speed of an engine that provides an input to the transmission. A control is configured to disengage at least one clutch and to modify the displacement of the source of pressurized fluid when the operational speed of the engine drops below a stall limit. The disengagement of at least one clutch and the modification of the displacement of the source of pressurized fluid allows the speed of the engine to increase above the stall limit.

It is to be understood that both the foregoing general description and the following detailed description are exemplary and explanatory only and are not restrictive of the invention, as claimed.

BRIEF DESCRIPTION OF THE DRAWINGS

The accompanying drawing, which are incorporated in and constitute a part of this specification, illustrate exemplary embodiments of the invention and together with the description, serve to explain the principles of the invention. In the drawings.

DETAILED OF DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
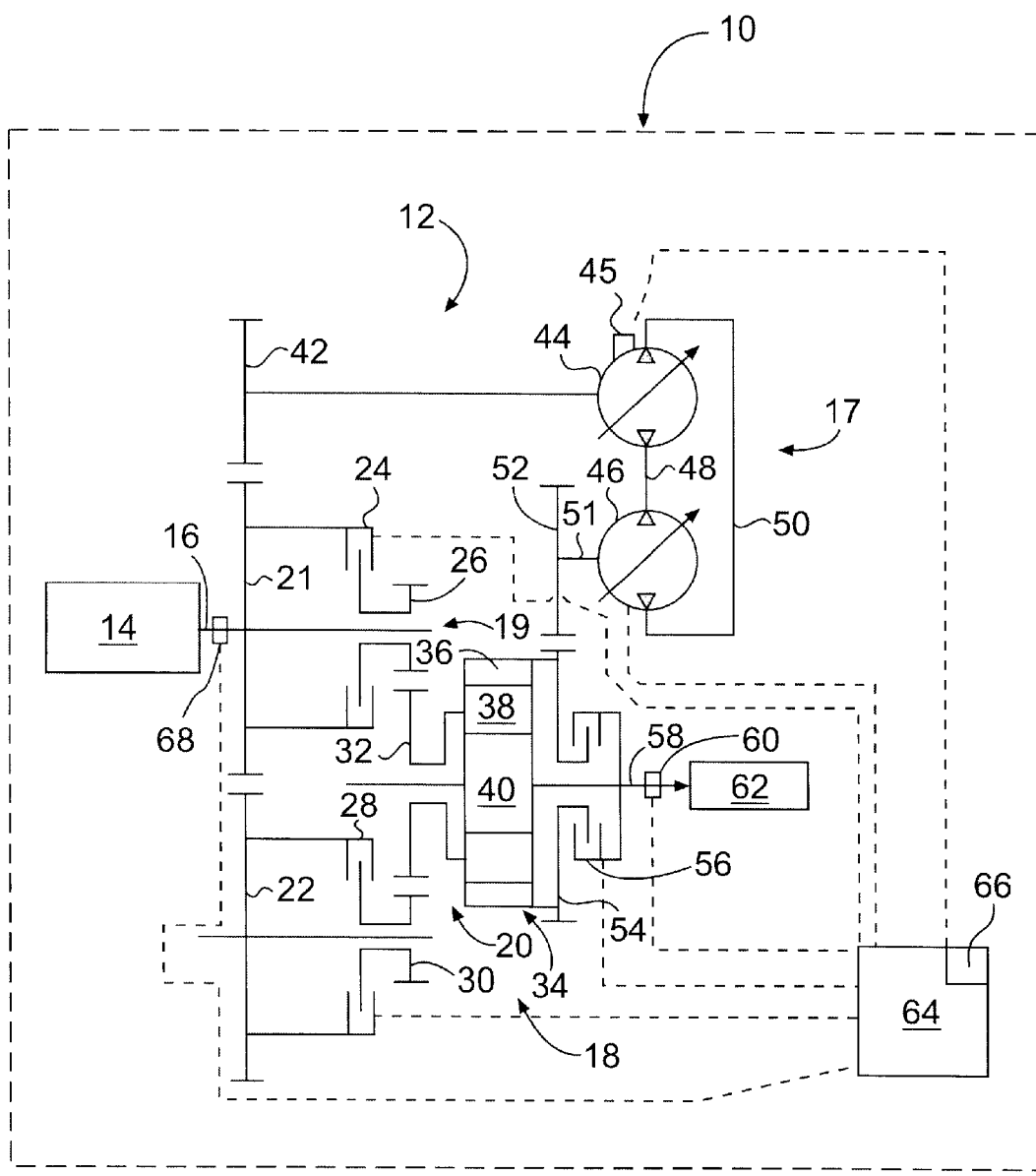
FIG. 1 is a schematic and diagrammatic illustration of a control system for a transmission in accordance with one exemplary embodiment of the present invention.

An exemplary embodiment of a transmission 12 for a work machine 10 is diagrammatically illustrated in FIG. 1. Transmission 12 may be referred to as a split torque transmission. Alternatively, transmission 12 may be a continuously variable transmission with a hydrostatic pump, an electrical transmission, or another transmission known to those having ordinary skill in the art.

As illustrated, work machine 10 includes an engine 14. Engine 14 is operable to generate a torque through a rotation of an engine crankshaft 16. Engine 14 typically includes a rated speed (e.g. rotational output speed of the crankshaft), which provides an indication of the standard operational speed of the engine. For example, an engine in a wheel loader may have a rated speed of approximately 1800 rpm.

Engine crankshaft 16 may transmit the torque generated by engine 14 to both a hydrostatic transmission 17 and a mechanical transmission 18. Although, it is envisioned that an electrical transmission may be used as an alternative to the hydrostatic transmission. An input gear 21 is connected to and rotates with engine crankshaft 16. A hydrostatic input gear 42 engages input gear 21. A rotation of input gear 21 results in a corresponding rotation of hydrostatic input gear 42, which provides the driving input to hydrostatic transmission 17.

As illustrated in FIG. 1, hydrostatic transmission 17 includes a source of pressurized fluid 44 that may be operated to generate a flow of pressurized fluid. Source of pressurized fluid 44 may be, for example, a variable displacement pump or any other device readily apparent to one skilled in the art as having a variable displacement capability. Source of pressurized fluid 44 is driven by the rotational input of hydrostatic input gear 42.

Source of pressurized fluid 44 may generate a fluid flow that is variable in both direction and rate and include, for example, an actuation device 45 that controls the rate and direction of the generated fluid flow. For example, actuation device 45 may be a solenoid activated swash plate. Actuation of the swash plate in a first direction generates a first flow of pressurized fluid through a first fluid line 48. Actuation of the swash plate in a second direction generates a second flow of pressurized fluid through a second fluid line 50. The magnitude of movement of the swash plate controls the rate of the generated fluid flow. For example, a partial movement of the swash plate in the first direction generates a partial displacement of fluid in the first direction. A full movement of the swash plate in the first direction generates a maximum displacement of fluid flow in the first direction.

First fluid line 48 and second fluid line 50 connect the source of pressurized fluid 44 with a fluid motor 46. Fluid motor 46 is operable to rotate a motor output shaft 51 based on the rate and direction of the fluid flow generated by source of pressurized fluid 44. For example, when the source of pressurized fluid 44 generates the first flow of fluid through first fluid line 48, fluid motor 46 rotates motor shaft 51 in a first direction at a speed that corresponds to the flow rate of the first flow of fluid. When the source of pressurized fluid 44 generates the second flow of fluid through second fluid line 50, fluid motor 46 rotates motor shaft 51 in a second, or opposite, direction at a speed that corresponds to the flow rate of the second flow of fluid.

Motor shaft 51 drives a hydrostatic output gear 52 that is engaged with a coupling gear 54. A clutch 56 may be engaged to fix coupling gear 54 to an output shaft 58. The engagement of clutch 56 creates a linkage between motor shaft 51 and output shaft 58. Thus, when clutch 56 is engaged and source of pressurized fluid 44 is activated to provide a flow of pressurized fluid to fluid motor 46, the resulting rotation of motor shaft 51 will cause a corresponding rotation of output shaft 58. By reversing the direction of fluid flow to fluid motor 46, the direction of rotation of output shaft 58 may also be reversed. The rotational speed of output shaft 58 may be varied by changing the displacement of source of pressurized fluid 44 to change the flow rate of fluid to fluid motor 46. In this manner, hydrostatic transmission 17 may be operated to provide a desired speed and direction of rotation of output shaft 58.

As illustrated in FIG. 1, mechanical transmission 18 may include a first gear assembly 19 to provide forward speeds and a second gear assembly 20 to provide reverse speeds. First gear assembly 19 may include a first clutch 24 and a forward drive gear 26 that is engaged with a mechanical output gear 32. Engagement of first clutch 24 drivingly connects forward drive gear 26 with engine crankshaft 16. When first clutch 24 is engaged, the rotational input of engine crankshaft 16 is translated to a corresponding rotation of mechanical output gear 32.

Second gear assembly 20 may include a reverse input gear 22 that is engaged with input gear 21, a second clutch 28, and a reverse drive gear 30 that is engaged with mechanical output gear 32. Engagement of second clutch 28 drivingly connects reverse drive gear 30 with engine crankshaft 16. When second clutch 28 is engaged, the rotational input of engine crankshaft 16 is translated to a corresponding rotation of mechanical output gear 32. The inclusion of reverse input gear 22 causes a reverse rotation of mechanical output gear 32 in response to a rotation of engine crankshaft 16. Thus, mechanical output gear 32 will rotate in one direction when first clutch 24 is engaged and in the opposite direction when second clutch 28 is engaged.

As also illustrated in FIG. 1, a summing gear assembly 34 is provided to selectively combine the outputs of hydrostatic transmission 17 and mechanical transmission 12. Summing gear assembly 34 of this exemplary embodiment includes a ring gear 36, a planet gear 38, and a sun gear 40 that is connected to output shaft 58. Output shaft 58 is connected to a power train 62 that may be used to move work machine 10.

In summing gear assembly 34, the relative rotational speeds and directions of ring gear 36 and planet gear 38 control the resulting rotational speed and direction of sun gear 40 and, therefore, output shaft 58. For example, if ring gear 36 is held stationary, the rotational speed and direction of planet gear 38 will determine the speed and direction of rotation of sun gear 40. If ring gear 36 is rotated in the same direction as planet gear 38, the rotational speed of sun gear 40 may be decreased accordingly. If ring gear 36 is rotated in the opposite direction of planet gear 38, the rotational speed of sun gear 40 may be increased accordingly.

The rotational speed and direction of ring gear 36 is controlled by hydrostatic transmission 17 through the engagement of coupling gear 54 and hydrostatic output gear 52. The rotational speed and direction of planet gear 38 is controlled by mechanical transmission 18 through the connection with mechanical output gear 32. Thus, by controlling the outputs of hydrostatic transmission 17 and mechanical transmission 18, the rotational speed and direction of output shaft 58 may be controlled to thereby control the speed of work machine 10.

As illustrated in FIG. 1, transmission 12 may include a control system 64. Control system 64 may include a computer, which has all the components required to run an application, such as, for example, a memory 66, a secondary storage device, a processor, such as a central processing unit, and an input device. One skilled in the art will appreciate that this computer can contain additional or different components. Furthermore, although aspects of the present invention are described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM.

Control system 64 may be configured to govern the operation of transmission 12. Control system 64 may govern transmission 12 by transmitting activation signals to activation device 45 and by transmitting appropriate signals to clutches 24, 28, and 56. In this manner, control system 64 may activate source of pressurized fluid 44 to provide a desired fluid flow to fluid motor 46 and may engage or disengage clutches 24, 28, and 56 to control mechanical transmission 18.

As also shown in FIG. 1, a series of sensors may be disposed in transmission 12 to provide information to control system 64 regarding the operational speed of engine 12. For example, an engine speed sensor 68 may be disposed adjacent engine crankshaft 16 to provide information regarding the rotational speed of engine crankshaft 16. In addition, an output speed sensor 60 may be disposed adjacent output shaft 58 to provide information regarding the rotational speed of output shaft 58. Other speed sensors may be positioned within transmission 12 to monitor the rotational speed of other shafts. These sensors may be any type of device readily apparent to one skilled in the art as capable of sensing rotational speed, such as, for example, potentiometers, thermistors and/or magnetic speed pickups or other conventional electrical transducers.

Figure 2:
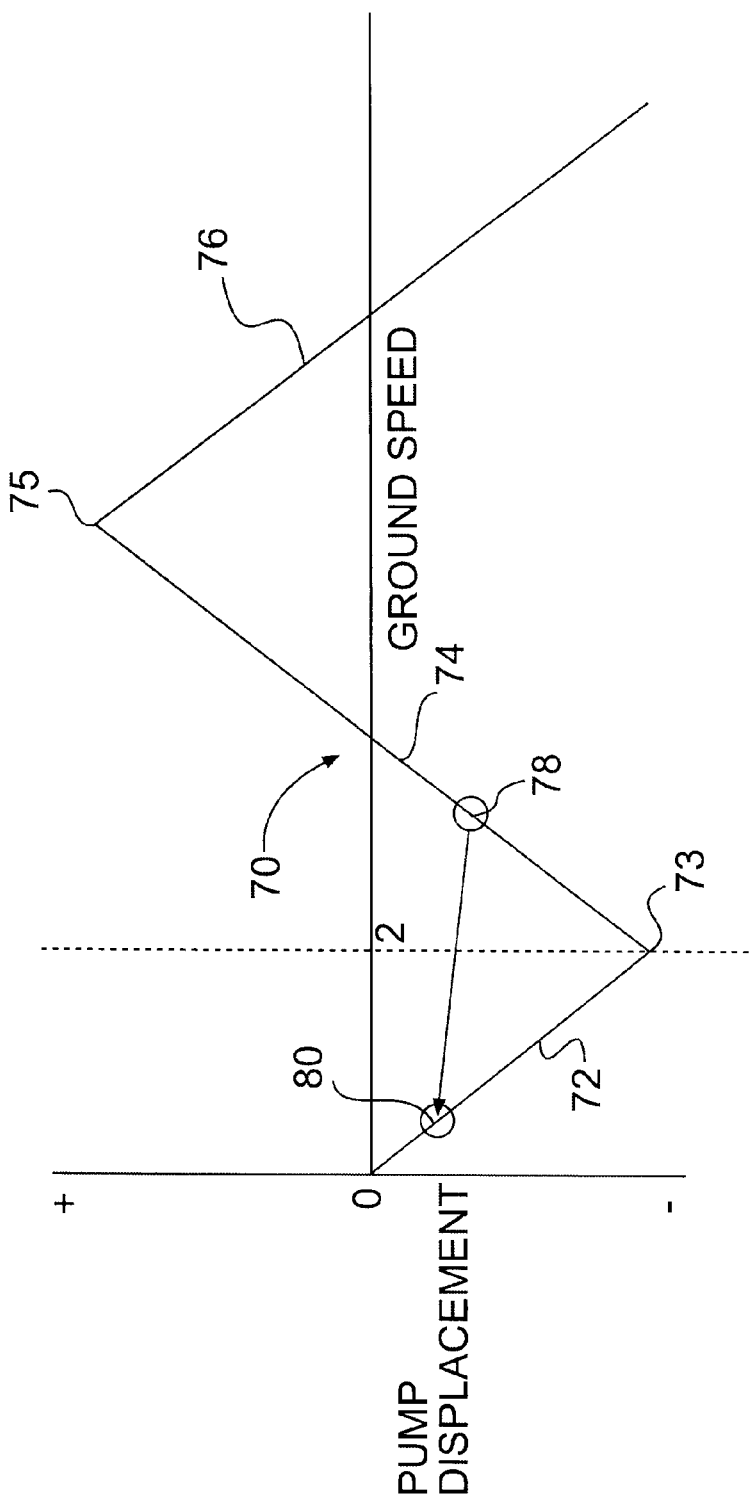
FIG. 2 is a graphic illustration depicting the displacement of a pump as a function of machine ground speed for a transmission.

In an exemplary embodiment, control system 64 may be used to vary the displacement of source of pressurized fluid 44 to achieve a particular ground speed of the machine (FIG. 2). Referring to FIG. 2, a plot 70 illustrates an exemplary rate and direction of fluid displacement of source of pressurized fluid 44 to achieve a first and a second speed ranges 72, 74 of transmission 12. As an example, first speed range 72 may provide speeds from 0 to 3.2 km/h (2 mph) and second speed range 74 may provide speeds from 3.2 km/h (2 mph) to 12.9 km/h (8 mph). Alternative embodiments of transmission 12 may provide for additional speed ranges and/or for smaller or larger speed ranges. For example, a third speed range 76 may be provided to achieve speeds above 12.9 km/h (8 mph).

When an operator requests that exemplary work machine 10 be accelerated through first speed range 72 and second speed range 74, control system 64 will engage clutch 56 and disengage first and second clutches 24, 28 to drive work machine 10 via hydrostatic transmission 17 (FIG. 1) alone. It may be seen that the pump displacement corresponding to the first speed range 72 is from 0 to a maximum negative displacement 73.

When source of pressurized fluid 44 reaches a peak negative displacement 73, control system 64 controls mechanical transmission 18 by increasing the speed of work machine 10 pursuant to second speed range 74. Accordingly, control system 64 disengages clutch 56 and engages first clutch 24. This combines the outputs of hydrostatic transmission 17 and mechanical transmission 18 to increase the ground speed of work machine 10. At the beginning of second speed range 74, ring gear 36 and planet gear 38 are rotating in the same direction. Accordingly, in the second speed range 74, the speed of work machine 10 is increased by coinciding with the decrease of the displacement of source of pressurized fluid 44 to thereby decrease the rotational speed of ring gear 36.

Control system 64 continues to increase the speed of work machine 10 through second speed range 74 by reducing the displacement of source of pressurized fluid 44 to zero, and thereafter, changing the direction of displacement of source of pressurized fluid 44. The change in direction of the displacement of source of pressurized fluid 44 will change the direction of rotation of ring gear 36 so that ring gear 36 is rotating in the opposite direction of planet gear 38. When ring gear 36 is rotating in a direction opposite to planet gear 38, an increase in the magnitude of the difference in rotational speeds between ring gear 36 and planet gear 38 will result in an increase in the rotational speed of output shaft 58. Thus, by increasing the displacement of source of pressurized fluid 44 when ring gear 36 and planet gear 38 are rotating in opposite directions, the speed of work machine 10 may be increased. The end of second speed range 74 is reached when source of pressurized fluid 44 reaches a peak positive displacement 75.

When an operator requests that the speed of work machine 10 be decreased, control system 64 will reverse the events described above. For example, if work machine 10 is operating at the higher end of second speed range 74, control system 64 will decrease the magnitude of displacement of source of pressurized fluid 44 to decrease the rotational speed difference between ring gear 36 and planet gear 38, to thereby decrease the rotational speed of output shaft 58. Control system 64 will continue to decrease the displacement of source of pressurized fluid 44 to zero and then reverse the direction of the displacement. The reversal of direction of displacement will cause ring gear 36 to begin rotating in the same direction as planet gear 48, to further reduce the rotational speed difference and the rotational speed of output shaft 58.

When source of pressurized fluid 44 reaches its maximum displacement 73, control system 64 will disengage mechanical transmission 18 to return to first speed range 72. Accordingly, control system 64 will disengage first clutch 24 and engage clutch 56. If desired, the speed of work machine 10 may then be reduced to zero by reducing the displacement of source of pressurized fluid 44 to zero.

Under some circumstances, work machine 10 may encounter an underspeed situation. This may occur, for example, when work machine 10 is climbing an incline or when work machine 10 encounters a heavy load, such as a wheel loader engaging a work pile. In these situations, the torque generated by engine 14 may not be sufficient to maintain the ground speed of work machine 10, and the speed of engine 14 will decrease as the work machine 10 slows. Unless transmission 12 is adjusted or the force exerted on work machine 10 decreases, the engine speed will continue to decrease until engine 14 stalls.

Figure 3:
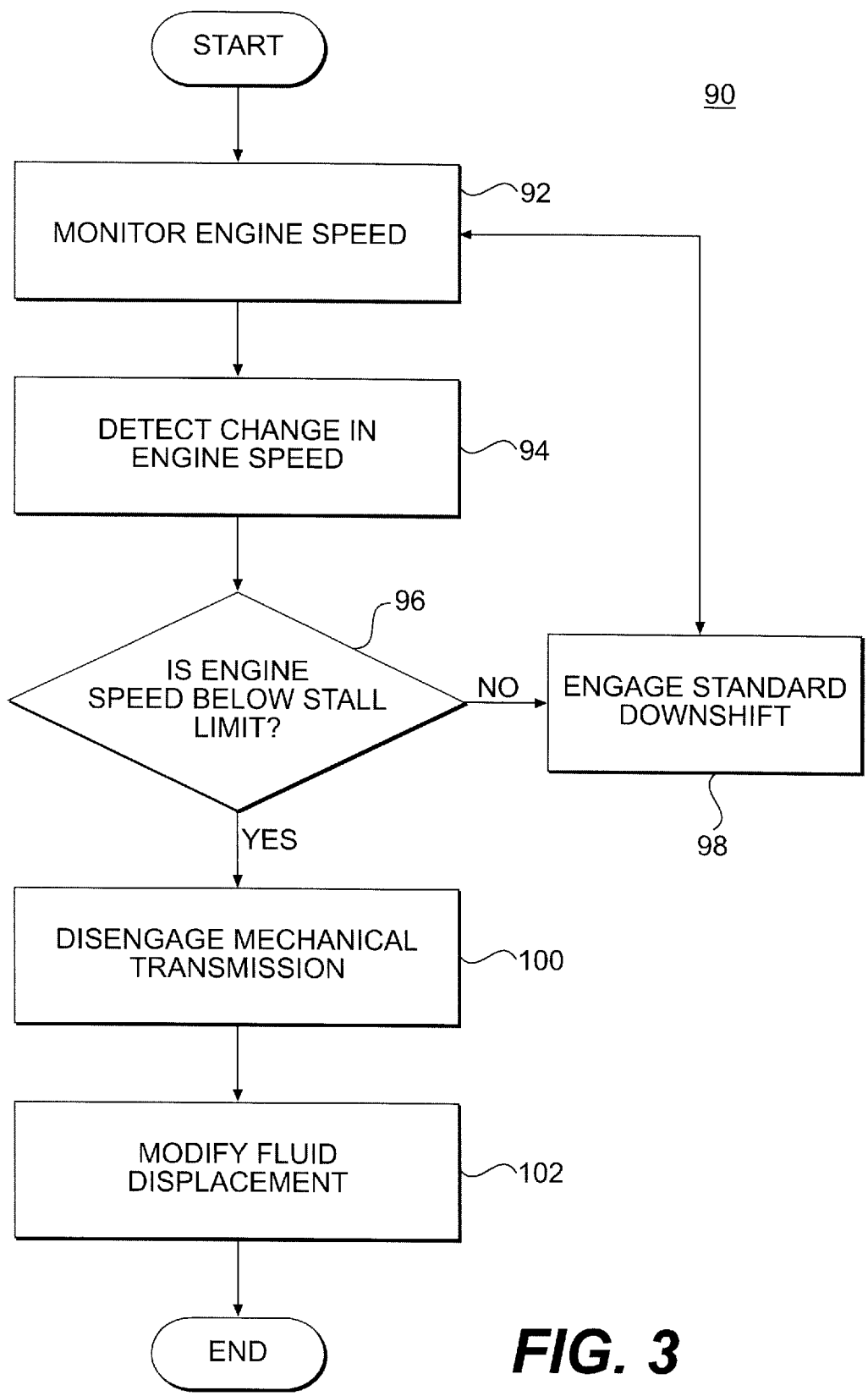
FIG. 3 is a flowchart illustrating a method of controlling a transmission in accordance with one exemplary embodiment of the present invention.

The flowchart of FIG. 3 illustrates an exemplary method (90) for handling underspeed situations in a work machine 10. Control system 64 (FIG. 1) monitors the rotational speed of engine 14 (Step 92). If work machine 10 is traveling at first speed 78 (referring to FIG. 2) and encounters a load that causes a decrease in engine speed, control system 64 detects the change in engine speed (Step 94).

Control system 64 determines if the engine speed has dropped below a stall limit (Step 96). The stall limit is a threshold value that indicates engine 14 is nearing a stall condition. A machine owner, manufacturer, or operator may determine the stall limit for a particular piece of equipment. The stall limit may depend upon, inter alia, the particular operating characteristics of engine 14 and may be calculated as a percentage of the rated speed of engine 14. For example, a wheel loader engine having a rated speed of approximately 1800 rpm may have a stall limit that is approximately 75% of the rated limit, or approximately 1400 rpm.

If the current engine speed is within an acceptable range of the rated speed, control system 64 will engage the standard downshift procedure described above (Step 98). In this situation, which may be typical of a work machine climbing an incline, the standard downshift process of transmission 12 will respond to the reduced engine speed by modifying the transmission settings to increase the engine speed and prevent engine 14 from stalling.

If, however, the current engine speed drops below the stall limit, the standard downshift process may not change transmission 12 quickly enough to prevent engine 14 from stalling. In this situation, which may occur when a work machine engages a work pile, control system 64 may override the standard downshift process and follow a forced downshift process.

In the forced downshift process, control system 64 adjusts transmission 12 to "jump" to a new speed range, instead of following the standard downshift. In the disclosed embodiment, control system 64 disengages mechanical transmission 18 by disengaging engaged clutches 24 and 28 and engaging clutch 56 (Step 100). Control system 64 may also modify the displacement of source of pressurized fluid 44 by adjusting the flow rate and/or direction of the generated fluid flow (Step 102) In this manner, control system 64 adjusts the settings of transmission 12 to "jump" from, for example, first speed 78 to second speed 80 (referring to FIG. 2) instead of following the standard downshift process. This jump will quickly reduce the torque requirements of engine 14 and may prevent engine 14 from stalling due to an underspeed situation.

In certain work machines, such as, for example, a wheel loader, the forced downshift process may only be encountered when the wheel loader engages a work pile. Accordingly, control system 64 may enable additional functions after the forced downshift process. For example, control system 64 may lock mechanical transmission 18 to prevent mechanical transmission 18 from being re-engaged until work machine 10 is operated in the reverse direction. This will prevent a "hunting" situation where transmission 12 moves between speed ranges to find the appropriate configuration. In addition, control system 64 may assume that the operator has engaged a work pile with the intention of digging a load of earth. Accordingly, control system 64 may activate an automatic dig function after the forced downshift process to improve the efficiency of the operation.

INDUSTRIAL APPLICABILITY

As will be apparent from the foregoing description, the present invention provides a control system for a transmission that may prevent the engine of a work machine from stalling. The control system monitors the operational speed of the engine and determines when the engine is nearing a stall point. When the engine is in danger of stalling, the control system jumps the transmission to a new speed setting that may prevent the stall from occurring.

The control system of the present invention may be implemented into any work machine that utilizes a split torque transmission or a continuously variable transmission with a hydrostatic pump to convert the rotational speed of an engine into a drive speed for the work machine. The control system of the present invention may be implemented into an existing work machine without any major modifications or the addition of expensive hardware. The control system of the present invention may improve the overall efficiency of a work machine by preventing inconvenient and work-interrupting engine stalls.

It will be apparent to those skilled in the art that various modifications and variations can be made in the control system of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method of controlling a transmission in a work machine, comprising:

combining the output of a hydrostatic transmission having a source of pressurized fluid with the output of a mechanical transmission having at least one engaged clutch;

sensing an operational speed of an engine that provides an input to both the hydrostatic transmission and the mechanical transmission; and disengaging the at least one clutch of the mechanical transmission and modifying the displacement of the source of pressurized fluid when the operational speed of the engine drops below a stall limit, the disengagement of the at least one clutch and the modification of the displacement of the source of pressurized fluid allowing the operational speed of the engine to rise above the stall limit.

2. The method of claim 1, wherein the stall limit is calculated as a percentage of a rated speed of the engine.

3. The method of claim 2, wherein the stall limit is approximately 75% of the rated speed of the engine.

4. The method of claim 1, wherein the step of modifying the displacement of the source of pressurized fluid includes changing at least one of the displacement rate and the displacement direction of a flow of fluid generated by the source of pressurized fluid.

5. The method of claim 1, further including preventing the engagement of the mechanical transmission until the work machine is operated in a reverse direction.

6. The method of claim 1, further including initiating an automatic dig function when the drop in the operational speed of the engine below the stall limit is detected.

7. The method of claim 1, wherein the step of sensing the operational speed of the engine includes sensing the rotational speed of an engine shaft.

8. A control system for a transmission combining a mechanical transmission having at least one clutch and a hydrostatic transmission having a source of pressurized fluid, comprising:

a sensor configured to sense the operational speed of an engine providing an input to the transmission; and a control configured to disengage the at least one clutch and to modify the displacement of the source of pressurized fluid when the operational speed of the engine drops below a stall limit, the disengagement of the at least one clutch and the modification of the displacement of the source of pressurized fluid allowing the speed of the engine to increase above the stall limit.

9. The control system of claim 8, wherein the stall limit is calculated as a percentage of a rated speed of the engine.

10. The control system of claim 8, wherein the control modifies the displacement of the source of the pressurized fluid to allow the speed of the engine to increase to approximately a rated speed of the engine.

11. The control system of claim 8, wherein the sensor is selected from a group including potentiometers, thermistors, and magnetic speed pickups.

12. A transmission, comprising:
- a mechanical transmission component having at least one clutch;
- a hydrostatic transmission component having a source of pressurized fluid;
- a summing gear assembly operatively joining the mechanical transmission component and the hydrostatic transmission component;
- a sensor configured to sense the operational speed of an engine providing an input to the mechanical and hydrostatic transmission components; and
- a control system configured to disengage the at least one clutch and to modify the displacement of the source of pressurized fluid when the operational speed of the engine drops below a stall limit, the disengagement of the at least one clutch and the modification of the displacement of the source of pressurized fluid allowing the speed of the engine to increase above the stall limit.

13. The transmission of claim 12, wherein the stall limit is calculated as a percentage of a rated speed of the engine.

14. The transmission of claim 12, wherein the source of pressurized fluid includes an activation device configured to control the rate and direction of a flow of fluid generated by the source of pressurized fluid.

15. The transmission of claim 12, wherein the source of pressurized fluid is a variable capacity pump.

16. The transmission of claim 12, wherein the mechanical transmission component and the hydrostatic transmission component combine to provide a drive speed in at least a first speed range and a second speed range.

17. The transmission of claim 16, wherein the disengagement of the at least one clutch and the modification of the displacement of the source of pressurized fluid moves the drive speed from the second speed range to the first speed range.

18. The transmission of claim 12, wherein the control system modifies the displacement of the source of the pressurized fluid to increase the speed of the engine to approximately a rated speed of the engine.

19. A work machine comprising:
- an engine having a rated speed, the engine operable to rotate an engine shaft;
- a transmission operatively connected to the engine shaft and including a mechanical transmission component having at least one clutch operable to engage the mechanical transmission component, a hydrostatic transmission component having a source of pressurized fluid operable to displace a pressurized fluid, and a summing gear arrangement configured to combine the outputs of the mechanical transmission component and the hydrostatic transmission component into a drive speed;
- a sensor disposed adjacent the engine shaft and configured to sense the speed of the engine; and
- a control system configured to disengage the at least one clutch and to modify the displacement of the source of pressurized fluid when the speed of the engine drops below a predetermined percentage of the rated speed of the engine, the disengagement of the at least one clutch and the modification of the displacement of the source of pressurized fluid allowing the speed of the engine to substantially return to the rated speed.

20. The work machine of claim 19, wherein the transmission provides at least a first range of drive speeds and a second range of drive speeds, and the disengagement of the at least one clutch and the modification of the displacement of the source of pressurized fluid moves the drive speed of the work machine from the second speed range to the first speed range.

* * * * *